United States Patent [19]
Nagaraj

[11] Patent Number: 5,905,404
[45] Date of Patent: May 18, 1999

[54] BOOTSTRAP CLOCK GENERATOR

[75] Inventor: Krishnaswamy Nagaraj, Somerville, N.J.

[73] Assignee: Lucent Technologies Inc., Murray Hill, N.J.

[21] Appl. No.: 08/810,750

[22] Filed: Mar. 4, 1997

[51] Int. Cl.[6] .......................... H03K 7/162; H03K 17/16
[52] U.S. Cl. ............................................ 327/589; 327/390
[58] Field of Search .................................. 327/390, 589, 327/536; 326/88; 307/110

[56] References Cited

U.S. PATENT DOCUMENTS

| | | | |
|---|---|---|---|
| 4,091,360 | 5/1978 | Lynch | 340/166 |
| 4,583,157 | 4/1986 | Kirsch et al. | 363/60 |
| 4,807,104 | 2/1989 | Floyd | 363/59 |
| 5,030,858 | 7/1991 | Sekiya | 307/520 |
| 5,051,881 | 9/1991 | Herold | 363/60 |

Primary Examiner—Timothy P. Callahan
Assistant Examiner—Hai L. Nguyen

[57] ABSTRACT

A bootstrap clock generator powered by a variable DC power supply voltage signal generates an approximate boost voltage signal depending on the DC power supply voltage signal level. The clock generator comprises a capacitor having a first and a second terminal and a first switching circuit coupled to the first terminal so as to couple the variable voltage supply signal to the first terminal. A second switching circuit is coupled to the second terminal so as to couple a variable reference voltage signal to the second terminal. A third switching circuit is coupled to the second terminal so as to connect a substantially fixed reference voltage signal to the second terminal. A first and a second control signal activates the switching circuits, such that the first control signal activates the first and second switching circuits, and the second control signal activates the third switching circuit.

18 Claims, 2 Drawing Sheets

BOOTSTRAP CLOCK GENERATOR

FIELD OF THE INVENTION

This invention relates to a clock generator, and more specifically to a bootstrap arrangement for generating a boosted clock signal in response to a varying power supply voltage signal.

BACKGROUND OF THE INVENTION

In recent years there has been an increased demand for integrated circuit chips that can operate with lower power supply voltage signals. Previously, many integrated circuits used to operate with DC power supply voltage signals, $V_{DD}$, in the range of about 5 volts. Recently, some manufacturers have developed integrated circuits that operate with DC power supply voltage signals, $V_{DD}$, in the range of 3 volts.

Most of the logic circuits, digital circuits, and some of the analog components of integrated circuits, work well with lower voltage signals, such as about 3 volts. However, there are many switching transistors employed in such integrated circuits which are intended to switch reference voltage signals having amplitudes that range between $V_{DD}$ and ground. Typically, such switching devices operate in response to an applied clock signal. For lower DC power voltage signals, such as 3 volts, these switching transistors may need to switch signals even lower than 3 volts. As a result, the switch signal applied to the gate source of a switching transistor may not be sufficient to activate the switches. For example, in order to turn a MOSFET switch "on" or "off", it may be required to apply a clock signal to the gate of the transistor having a magnitude larger than the lower level power supply voltage signals, such as about 3 volts.

Typically, in prior art devices employing a low voltage DC power supply, a level shifter or a fixed voltage boost arrangement is used to generate the required clock signals for operating the switches. Therefore, a voltage level shifter or a booster circuit may provide a clock signal that has a magnitude higher than the DC power source, sufficient to operate the switching devices reliably.

Recently, there has been a demand for integrated circuits that can operate with either low or high voltage DC power supplies, such as 3 volts and 5 volts. A shortcoming with prior art fixed level shifters or boost circuits is that they are not appropriate for integrated circuits that are intended to operate with either low or high voltage DC power supplies. This follows because a fixed level shifter or boost circuit that generates a clock signal, appropriately shifts the magnitude of a lower supply voltage signal to an appropriate clock signal level. However, the same level shifter may shift the magnitude of a higher supply voltage signal to a clock signal level that is sufficiently high to damage the switching devices.

Furthermore, in many battery operated applications, the voltage level of the battery diminishes with use and time. Therefore, when the battery is fresh, the integrated circuit powered by the battery works appropriately. However, as the life of the battery diminishes, the clock signal applied to the switching circuits may not attain a sufficient level capable of operating the switches. Again a fixed level shifter or a boost circuit may not be appropriate in this situation. When the battery is fresh, the fixed level shifter may provide a clock signal level that is sufficiently high to cause damage to the switching devices.

Thus, there is a need for a variable level shifter or a boost circuit which can operate with a variable DC power supply that generates either a low or high DC power signal, and can generate an appropriate boost in response to the DC power supply voltage level.

SUMMARY OF THE INVENTION

The present invention relates to a bootstrap clock generator. In an exemplary embodiment a bootstrap signal generator is powered by a DC power supply having a variable voltage supply signal, comprising: a level shifter capacitor having a first and a second terminal; a first switching circuit coupled to the first terminal for connecting the variable voltage supply signal to the first terminal, when the switch is activated; a second switching circuit coupled to the second terminal for connecting a reference voltage signal varying as a function of the variable voltage supply signal, when the switch is activated; and a third switching circuit coupled to the second terminal for connecting a second reference voltage signal to the second terminal, when the third switch is activated and the first and second switches are deactivated, such that a variable boosted signal level is generated at the first terminal.

In accordance with another embodiment of the invention, a fourth switching circuit is coupled to the first terminal of the capacitor, and is activated to provide the boosted signal to a plurality of switching devices employed in a given circuit arrangement.

DETAILED DESCRIPTION OF THE INVENTION

Figure 1:
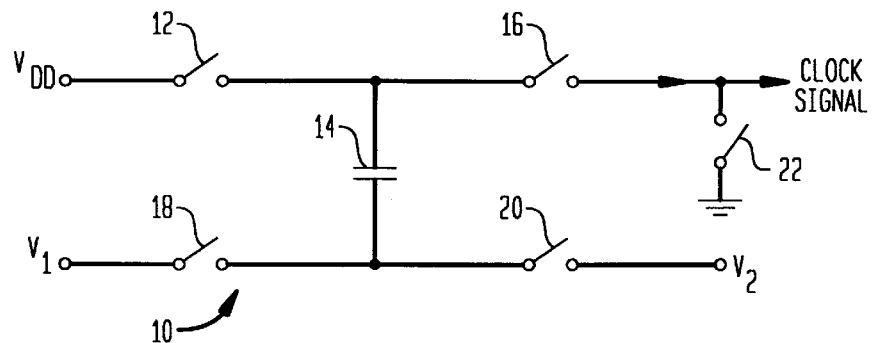
FIG. 1 illustrates a schematic diagram of a bootstrap clock generator in accordance with one embodiment of the present invention.

FIG. 1 illustrates a schematic diagram of a bootstrap clock generator, such as 10, in accordance with one embodiment of the invention, although the invention is not limited in scope to this embodiment. A first terminal of capacitor 14 is coupled to a DC power supply voltage signal, $V_{DD}$, via a switching circuit 12. The first terminal is also coupled to the output port of clock generator 10 via a switching circuit 16, so as to provide a boosted clock signal as explained here. A switching circuit 22 couples the output port of clock generator 10 to ground level. The second terminal of capacitor 14 is coupled to a variable voltage reference signal, $V_1$, via a switching circuit 18. Likewise the second terminal of capacitor 14 is coupled to a fixed voltage reference signal, $V_2$.

During operation, a first and a second contained signal, defining a two phase periodic switching signal, 180° apart, control the operation of the switching circuits employed in the bootstrap clock generator, in accordance with one embodiment of the invention, such as 10. Thus, during the first phase of the switching signal, switching circuits 12, 18 and 22 are activated. Similarly, during the second phase of the switching signal, switching circuits 16 and 20 are activated.

When switches 12 and 18 are activated, the top plate of capacitor 14 charges to a voltage signal, substantially equal to $V_{DD}$, and the lower plate of capacitor 14 charges to a voltage signal, substantially equal to $V_1$. When switches 12 and 18 are deactivated, the voltage signal at the top plate of capacitor 14 is substantially equal to $V_{DD}-V_1$. At the same time switches 16 and 20 are activated, such that the voltage signal at the lower plate of capacitor 14 becomes substantially equal to $V_2$. As a result the voltage signal at the top plate of capacitor 14 becomes substantially equal to $$(V_{DD}-V_1)+V_2 \qquad (1)$$

or $$V_{DD}+(V_2-V_1) \qquad (2)$$

Therefore, in accordance with one embodiment of the invention, by controlling the adjustable $(V_2-V_1)$ component in equation (2) it is possible to control the amount of boost voltage signal, V Boost, that is added to voltage supply signal $V_{DD}$. For example, when $V_{DD}$, is substantially equal to 5 volts, the adjustable component in equation (2) is configured to be substantially equal to zero, which may lead to a no boost situation. Conversely, when $V_{DD}$, is substantially equal to 3 volts, the adjustable component in equation (2) is configured to attain its highest value, which may lead to a substantially high boost situation.

The output of the bootstrap clock generator in accordance with the present invention maintains an appropriate voltage signal level because of the adjustable boost signal, which is only provided when necessary, in an amount equal to the adjustable component of equation (2). As a result, the switching circuits responsive to the output clock signal generated by clock generator 10, will function properly without running a substantial risk of damage associated with fixed boost circuits, as previously explained.

Figure 2:
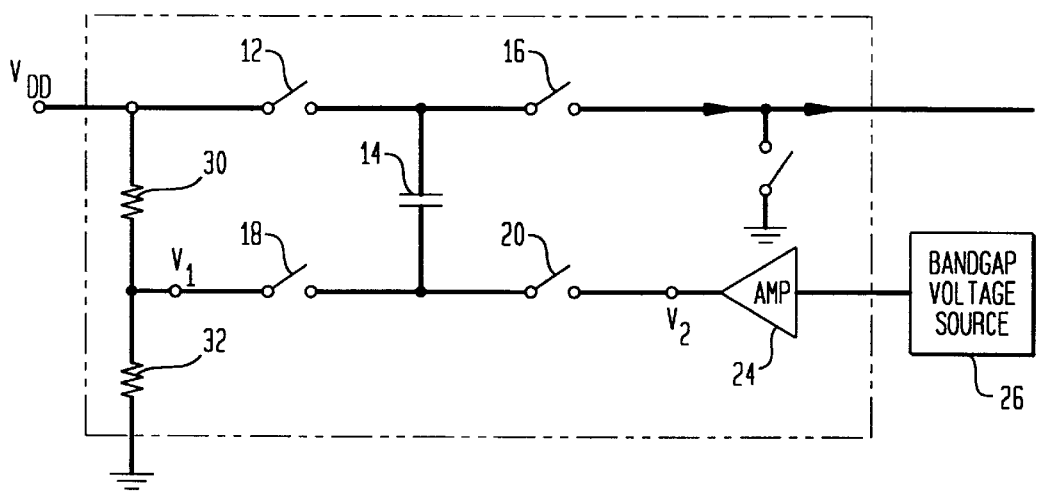
FIG. 2 illustrates a more detailed schematic diagram of a bootstrap clock generator in accordance with one embodiment of the present invention.

FIG. 2 illustrates a bootstrap clock generator that employs an arrangement which implements Eq. (2) in accordance with one embodiment of the present invention, although the invention is not limited in scope to this implementation. Thus, supply voltage signal, $V_{DD}$, is coupled to a voltage divider formed by resistors 30 and 32, which in turn provide an output voltage signal, $V_1$, to the lower plate of capacitor 14 via a switching circuit 18. The magnitude of voltage signal, $V_1$, is a function of supply voltage signal, $V_{DD}$, and therefore varies in response to variations in $V_{DD}$.

A bandgap voltage source 26 provides a fixed reference voltage signal to an amplifier 24, which in turn, provides the voltage signal, $V_2$, to the lower plate of capacitor 14 via switching circuit 20. It is noted that most chips provide a fixed reference bandgap voltage source which may be employed in accordance with the present invention as illustrated in FIG. 2, although the invention is not limited in scope in this aspect. For example, instead of bandgap voltage source 26, a fixed reference voltage source may be employed.

In accordance with the embodiment illustrated in FIG. 2, the variable voltage reference signal, $V_1$, of bootstrap clock generator of FIG. 2 is defined as $$V_1=V_{DD}/n \qquad (3)$$

and, the fixed voltage reference signal, $V_2$, of bootstrap clock generator of FIG. 2 is defined as $$V_2=V_{DES}/n \qquad (4),$$

where $V_{DES}$ is a desired voltage signal level such that when $V_{DD}$ is outstandingly equal to $V_{DES}$, bootstrap clock generator 10 provides no boost voltage signal. Typically, $V_{DES}$= 5, for switching circuits that function properly in response to an activating voltage signal substantially equal to 5 volts. Furthermore, n, is a given number, such that $V_2$ does not exceed the lowest desired level of power supply voltage signal, $V_{DD}$. For $V_{DD}$=3V, the minimum value for n is about 2. Therefore, in one embodiment of the present invention $$V_2=5V/2=2.5 \text{ volts} \qquad (5),$$

and $$V_{boost}=(V_2-V_1)=(5-V_{DD})/2 \qquad (6),$$

where $V_{boost}$ is the voltage boost signal achieved by bootstrap clock generator 10 in accordance with one embodiment of the present invention illustrated in FIG. 2. Thus, the voltage boost signal goes to zero as $V_{DD}$ reaches 5 volts. When the power supply voltage signal level decreases to about 3 volts, the voltage boost signal $V_{boost}$, increases to about 1 volt. This increase is usually adequate for most applications.

Figure 3B:
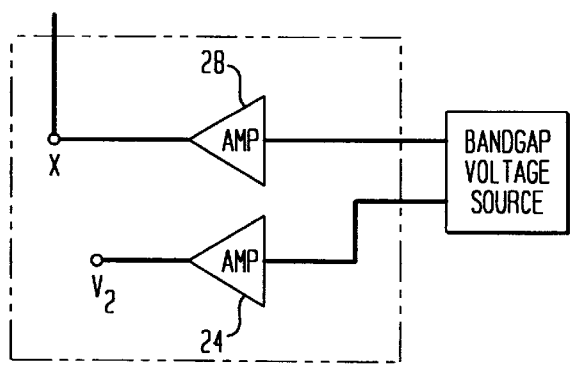
FIGS. 3(a) and 3(b) illustrate still another schematic diagram of a bootstrap clock generator in accordance with another embodiment of the present invention.
Figure 3A:
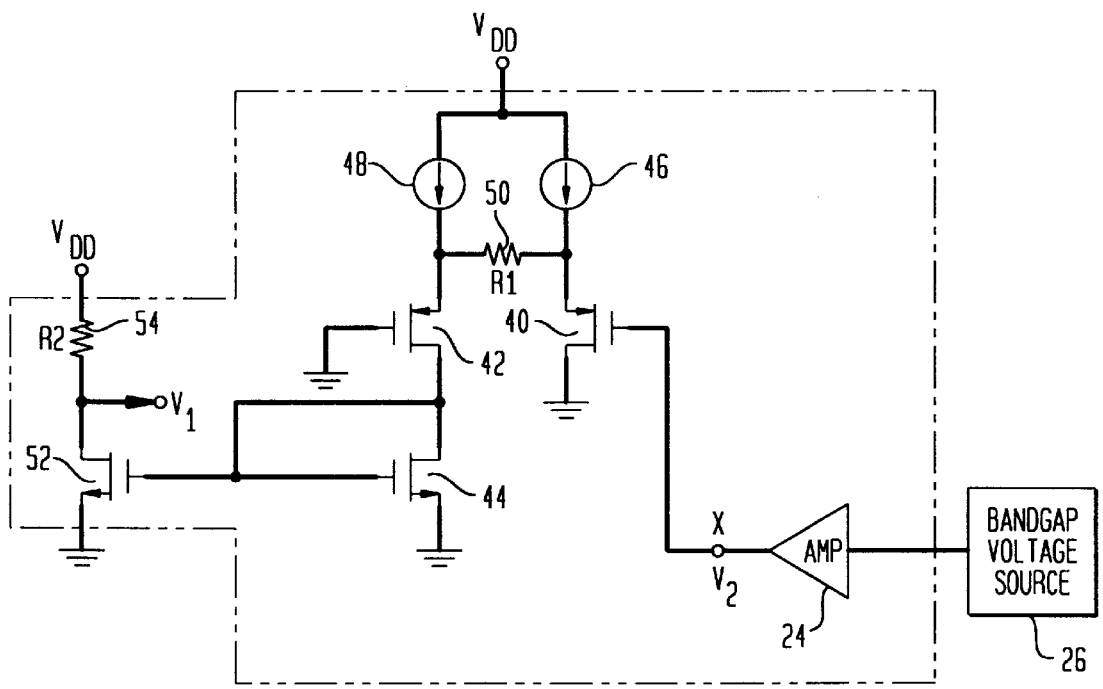

FIGS. 3(a) and 3(b) illustrate another embodiment of an arrangement to provide a variable reference voltage signal, $V_1$, and a fixed reference voltage signal, $V_2$, for the bootstrap clock generator in accordance with the present invention, although the invention is not limited in scope to this arrangement. In accordance with the arrangement illustrated in FIGS. 3(a) and 3(b), the reference voltage signal, $V_1$, and the fixed reference voltage signal, $V_2$, may be defined $$V_1=V_{DD}-x \qquad (7),$$

and $$V_2=5-x \qquad (8),$$

where "x" is a given parameter, or constant, substantially independent from process and temperature variations. It is noted that Eq. (8) applies to a situation, where switching circuits function properly in response to voltage signal levels of about 5 volts. It follows that the boost voltage signal, $$V_{boost}=5-V_{DD} \qquad (9).$$

Thus, a bootstrap clock generator that functions in accordance with Eq. 9, provides a boosted voltage substantially equal to 5 volts, in response to a wide range of voltage signal levels, $V_{DD}$. In one embodiment as illustrated in FIG. 3(a), $$x=2.5 \text{ volts} \qquad (10),$$

and $$V_2=5-2.5=2.5 \text{ volts} \qquad (11).$$

In order to implement equations (7), (10) and (11), an output port of a bandgap voltage source 26 is coupled to an input port of amplifier 24, which provides a voltage signal, $V_2$, which is substantially equal to 2.5 volts. The output terminal of amplifier 24 is coupled to a differential pair comprising of p-channel MOSFET transistors 40 and 42. The gate terminal of transistor 40 is coupled to the output port of amplifier 24, and the gate terminal of transistor 42 is coupled to the ground level. The source terminals of the transistors are coupled to the power supply voltage signal, $V_{DD}$, via current sources 46 and 48 respectively. The source terminals of the transistors are also coupled together via a resistor 50 having a resistance R. The drain terminal of transistor 42 is coupled to a current mirror formed by transistors 44 and 52. The drain terminal of transistor 52 is coupled to the power supply voltage signal, $V_{DD}$, via a resistor 54 having a resistance R. It is noted that the invention is not limited in scope in that respect and the resistance of resistors 50 and 54 may be different. The drain terminal of transistor 52 provides the variable reference voltage signal $V_1$.

It is noted that the current generated through the current mirror is $$I = x/R = V_2/R = 2.5/R \qquad (12),$$

and the variable reference voltage signal is $$V_1 = V_{DD} - (x/R*R) = V_{DD} - x = V_{DD} - 2.5 \qquad (13),$$

and therefore, $$V_{boost} = V_2 - V_1 = 5 - V_{DD}, \qquad (14)$$

which is the same result described by Eq. (9).

FIG. 3(b) illustrates the arrangement where fixed reference voltage signal, $V_2$, is not equal to constant signal, x. As a result, it is necessary to provide two separate voltage signals, representing $V_2$ and x. As illustrated in FIG. 3(b), two output terminals of bandgap voltage source 26 are respectively coupled to an input terminal of amplifier 28, which provides a fixed voltage signal, x, and to an input terminal of amplifier 24, which provides a fixed reference voltage signal, $V_2$. Fixed voltage signal, x, is coupled to the differential pair comprising transistors 40 and 42 as illustrated in FIG. 3(a). Fixed reference voltage signal, $V_2$, is coupled to the lower plate of capacitor 14 as illustrated in FIGS. 1 and 2.

Thus, in accordance with the principles of the present invention, in a bootstrap clock generator employing the arrangement shown in FIG. 3(b), the value of voltage signal, $V_2$, is defined by equation (8), and the value of voltage signal, $V_1$, is defined by equation (7). As illustrated before, the boost voltage signal, $V_{boost}$, is defined by equation (9).

Figure 4:
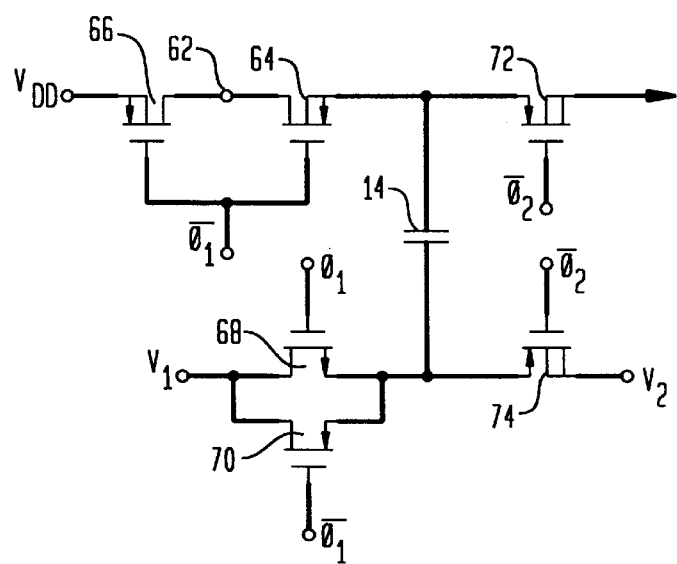
FIG. 4 illustrates an exemplary schematic diagram of a bootstrap clock generator in accordance with the embodiment of the present invention, shown in FIG. 1.

FIG. 4 illustrates a switching arrangement for activating and deactivating the switches employed in the bootstrap clock generator in accordance with one embodiment of the present invention, although the invention is not limited in scope in that respect.

Power supply voltage signal, $V_{DD}$, is coupled to the top plate of capacitor 14 via PMOS transistors 66 and 64. The gate terminals of transistors 66 and 62 are coupled together and to an output terminal of a clock signal, $-\phi_1$. The source of transistor 64 is coupled to the top plate of capacitor 14, and its drain is coupled to the drain of transistor 66. The source of transistor 66 is coupled to power supply voltage signal, $V_{DD}$. It is noted that the body of transistor 64 is also coupled to the top plate of capacitor 14, where as the body of transistor 66 is coupled to power supply voltage signal, $V_{DD}$. The top plate of capacitor 14 is also coupled to a PMOS transistor 72, which is responsive to a clock signal, $\phi_2$, via its gate terminal.

The bottom plate of capacitor 14 is coupled to variable reference voltage signal, $V_1$, via a transmission gate formed by transistors 68 and 70, which are respectively responsive to clock signals, $\phi_1$ and $-\phi_1$. Likewise the bottom plate of capacitor 14 is coupled to the fixed reference voltage signal, $V_2$, via a transistor switch 74, which is responsive to clock signal, $\phi_2$, via its gate terminal.

During normal operation, the top plate of capacitor 14 is typically equal to or higher than power supply voltage signal, $V_{DD}$. As a result, the body of transistor 64 is appropriately biased. Transistor 66 is provided so as to prevent transistor 64 to be forward biased during the power up. This follows because during power up, the top plate of capacitor 14 is not charged and as a result is at the ground level. Power supply voltage signal, $V_{DD}$, achieves its value at a substantially quicker time than the top plate of capacitor 14. During this time, absent transistor 66, the body of transistor 64 would be coupled to a lower voltage level than its drain. Consequently, the drain-body junction of transistor 64 becomes forward biased and may lead to a latch-up. However, transistor 66 prevents transistor 64 from latching-up during power up. For example, it is possible to configure the sizes of transistors 66 and 64, such that the variation in voltage signal level at node 62 lags that of voltage signal level, $V_{DD}$, so that the voltage between the body and drain of transistor 64 does not exceed a value that forward biases drain-body junction of transistor 64.

It is noted that in many applications, there is need for two or more bootstrap clock generator circuits such as those described in reference with FIGS. 1–4. For example, because each bootstrap clock generator circuit of the present invention provides a clock signal only during one clocking phase, it may be necessary to provide a second bootstrap clock generator circuit that provides a clock signal at a second clock phase, 180° apart from the first clock phase. In that event it is also possible to use the output clock signal of each bootstrap clock generator to activate and deactivate the switches employed in the other bootstrap clock generator.

Furthermore, when it is necessary to activate and deactivate a plurality of switches in an integrated circuit chip, there may be a need for many bootstrap clock generator circuits of the present invention, so as to properly drive all the switches.

It is also noted that the bootstrap clock generator circuit may be employed in an integrated circuit chip that contains other circuitry. Furthermore, although the principles of the present invention have been described in conjunction with a bootstrap clock generator, it will be appreciated that there may be many other uses for the embodiments described herein. For example, the clock generator in accordance with the present invention may be adapted to function as a variable level shifter, which provides a boosted voltage signal, in response to a variable voltage signal source, which is intended to be boosted. This boosted voltage signal may be at a substantially fixed desired level, regardless of the value of the variable voltage signal source, for example by employing the arrangement illustrated in FIGS. 3(a) and 3(b).

While only certain features of the invention have been illustrated and described herein, many modifications, substitutions, changes or equivalents will now occur to those skilled in the art. It is therefore, to be understood that the appended claims are intended to cover all such modifications and changes as fall within the true spirit of the invention.

I claim:

1. A bootstrap clock generator powered by a variable DC power supply voltage signal for generating a boost voltage signal at the output port of said clock generator, comprising:

a capacitor having a first and a second terminal, the first terminal being coupled to output port;

a first switching circuit coupled to said first terminal so as to couple said variable voltage supply signal to said first terminal;

a second switching circuit coupled to said second terminal so as to couple a variable reference voltage signal to said second terminal; and a third switching circuit coupled to said second terminal so as to connect a substantially fixed reference voltage signal to said second terminal.

2. The invention in accordance with claim 1, further comprising a first and a second control signal so as to activate said switching circuits, such that said first control signal activates said first and second switching circuits, and said second control signal activates said third switching circuit.

3. The invention in accordance with claim 2, further comprising a fourth switching circuit so as to provide the voltage signal level generated at said first terminal of said capacitor, to said output port of said clock generator.

4. The invention in accordance with claim 3, wherein said fourth switching circuit is controlled by said second control signal.

5. The invention in accordance with claim 3, wherein said first and second control signal define a two-phase periodic switching signal having a phase difference of about 180°.

6. The invention in accordance with claim 1, wherein said variable voltage reference signal is defined as $V_{DD}/n$, and said fixed reference voltage signal is defined as $V_{DES}/n$ wherein $V_{DD}$ is a voltage signal provided by said variable DC power supply, $V_{DES}$, is a desired voltage signal level such that when $V_{DD}$ is substantially equal to $V_{DES}$, said clock generator provides no boost voltage signal, and n is a given number such that said fixed reference voltage signal does not exceed the lowest voltage signal level attained by said variable DC power supply, during its normal operation.

7. The invention in accordance with claim 6, wherein said desired voltage signal level, $V_{DES}$, is substantially equal to 5 volts and said voltage boost signal, $V_{boost}$, is substantially defined as $$(5-V_{DD})/2$$

whereby said voltage boost signal becomes substantially zero as said power supply voltage signal, $V_{DD}$, reaches 5 volts.

8. The invention in accordance with claim 1, wherein said variable voltage reference signal is defined as $V_{DD}-x$, and said fixed reference voltage signal is defined as $V_{DES}-x$, wherein $V_{DD}$, is a voltage signal provided by said variable DC power supply, and $V_{DES}$, is a desired voltage signal level such that when $V_{DD}$ is substantially equal to $V_{DES}$, said clock generator provides no boost voltage signal, and x is a given constant.

9. The invention in accordance with claim 8, wherein said desired voltage signal level, $V_{DES}$ is substantially equal to 5 volts and said boost voltage signal is substantially equal to a $5-V_{DD}$, whereby said voltage boost signal becomes substantially zero when said power supply voltage signal becomes substantially equal to 5 volts, and said voltage boost signal becomes substantially equal to 2 volts, when said power supply voltage signal becomes substantially equal to 3 volts.

10. A bootstrap clock generator powered by a variable DC power supply voltage signal for generating a boost voltage signal at an output port of said clock generator, said bootstrap clock generator comprising:

a capacitor having a first and a second terminal, the first terminal being coupled to output port;

a first switching circuit coupled to said first terminal so as to couple said variable voltage supply signal to said first terminal;

a second switching circuit coupled to said second terminal so as to couple a variable reference voltage signal to said second terminal, said variable reference voltage signal being provided by a voltage divider circuit coupled to said power supply voltage signal; and a third switching circuit coupled to said second terminal so as to connected a substantially fixed reference voltage signal to said second terminal, said fixed reference voltage signal being provided by a fixed reference voltage source.

11. The invention in accordance with claim 10, wherein said fixed reference voltage source is provided at the output terminal of an amplifier which is responsive to a bandgap voltage source.

12. The invention in accordance with claim 11, wherein said variable voltage reference signal is defined as $V_{DD}/n$, and said fixed reference voltage signal is defined as $V_{DES}/n$ wherein $V_{DD}$ is a voltage signal provided by said variable DC power supply, $V_{DES}$, is a desired voltage signal level such that when $V_{DD}$ is substantially equal to $V_{DES}$, said clock generator provides no boost voltage signal, and n is a given number such that said fixed reference voltage signal does not exceed the lowest voltage signal level attained by said variable DC power supply, during its normal operation.

13. The invention in accordance with claim 12, wherein said desired voltage signal level, $V_{DES}$, is substantially equal to 5 volts and said voltage boost signal, $V_{boost}$, is defined as being substantially equal to $$(5-V_{DD})/2$$

whereby said voltage boost signal becomes substantially zero as said power supply voltage signal, $V_{DD}$, reaches 5 volts.

14. In an integrated circuit, a bootstrap clock generator powered by a variable DC power supply voltage signal for generating a boost voltage signal at an output port of said clock generator, said bootstrap clock generator comprising:

a capacitor having a first and a second terminal, the first terminal being coupled to the output port;

a first switching circuit coupled to said first terminal so as to couple said variable voltage supply signal to said first terminal;

a variable reference voltage signal source and a fixed reference voltage signal source, wherein said variable voltage reference signal is defined as $V_{DD}-x$, and said fixed reference voltage signal is defined as substantially equal to $V_{DES}-x$, wherein $V_{DD}$, is a voltage signal provided by said variable DC power supply, and $V_{DES}$, is a desired voltage signal level such that when $V_{DD}$ is substantially equal to $V_{DES}$, said clock generator provides no boost voltage signal, and x is a given constant;

a second switching circuit coupled to said second terminal so as to couple said variable reference voltage signal to said second terminal; and a third switching circuit coupled to said second terminal so as to connect said substantially fixed reference voltage signal to said second terminal.

15. The invention in accordance with claim 14, wherein said desired voltage signal level, $V_{DES}$ is substantially equal to 5 and said boost voltage signal is substantially equal to $5-V_{DD}$, whereby said voltage boost signal becomes substantially zero when said power supply voltage signal becomes substantially equal to 5 volts, and said voltage boost signal becomes substantially equal to 2 volts, when said power supply voltage signal becomes substantially equal to 3 volts.

16. The invention in accordance with claim 15 wherein said variable reference voltage signal source further comprises;

a fixed reference voltage source providing said given constant voltage signal, x;

a voltage-to-current converter responsive to said given constant voltage signal, x, so as to provide a substantially constant current;

a resistor coupled to said voltage to current converter and said power supply voltage signal, so as to provide said variable reference voltage signal.

17. A method for providing a boosted clock signal at an output port of a clock generator in response to a variable DC power supply voltage signal source, comprising the steps of:

applying, during a first switching cycle, said power supply voltage signal to a first terminal of a capacitor and a variable reference voltage signal to a second terminal of said capacitor, wherein said variable voltage reference signal is defined as $V_{DD}-x$, wherein $V_{DD}$, is a voltage signal provided by said variable DC power supply, and x is a given constant voltage signal level; and applying, during a second switching cycle, a fixed reference voltage signal defined as $V_{DES}-x$, to said second terminal, wherein $V_{DES}$, is a desired voltage signal level such that when $V_{DD}$ is substantially equal to $V_{DES}$, said clock generator provides no boost voltage signal.

18. A method for providing a boosted clock signal at an output port of a clock generator in response to a variable DC power supply voltage signal source, comprising the steps of:

applying, during a first switching cycle, said power supply voltage signal to a first terminal of a capacitor and a variable reference voltage signal to a second terminal of said capacitor, wherein said variable voltage reference signal is defined as $V_{DD}/n$, wherein $V_{DD}$ is a voltage signal provided by said variable DC power supply; and applying during a second switching cycle, a fixed reference voltage signal to a second terminal of said capacitor, said fixed reference voltage signal defined as $V_{DES}/n$, wherein $V_{DES}$, is a desired voltage signal level such that when $V_{DD}$ is substantially equal to $V_{DES}$, said clock generator provides no boost voltage signal, and n is a given number such that said fixed reference voltage signal does not exceed the lowest voltage signal level attained by said variable DC power supply, during its normal operation.

* * * * *